United States Patent
Gao et al.

(10) Patent No.: US 9,646,494 B2
(45) Date of Patent: *May 9, 2017

(54) BICYCLE DIFFERENTIATION USING VIDEO DATA ANALYTICS

(71) Applicant: ITERIS, INC., Santa Ana, CA (US)

(72) Inventors: Yan Gao, Placentia, CA (US); Robert J. Hwang, Brea, CA (US); Wing Lam, Anaheim, CA (US); Todd W. Kreter, Irvine, CA (US); Michael T. Whiting, Rancho Santa Margarita, CA (US); Matthew Linton, Tustin, CA (US)

(73) Assignee: ITERIS, INC., Santa Ana, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 14/852,523

(22) Filed: Sep. 12, 2015

(65) Prior Publication Data
US 2016/0005312 A1 Jan. 7, 2016

Related U.S. Application Data

(63) Continuation of application No. PCT/US2014/022874, filed on Mar. 10, 2014.

(51) Int. Cl.
| | | |
|---|---|---|
| *G08B 21/00* | (2006.01) | |
| *G08G 1/015* | (2006.01) | |
| *G08G 1/04* | (2006.01) | |
| *G08G 1/08* | (2006.01) | |
| *G08G 1/087* | (2006.01) | |
| *G06K 9/00* | (2006.01) | |

(52) U.S. Cl.
CPC ......... *G08G 1/015* (2013.01); *G06K 9/00785* (2013.01); *G08G 1/04* (2013.01); *G08G 1/08* (2013.01); *G08G 1/087* (2013.01)

(58) Field of Classification Search
CPC ...................................................... G01G 1/01
USPC .......... 340/933, 937; 701/300; 382/103, 104
See application file for complete search history.

(56) References Cited

U.S. PATENT DOCUMENTS

| | | | | |
|---|---|---|---|---|
| 5,652,577 A | * | 7/1997 | Frasier ................... | G08G 1/042 324/236 |
| 7,991,522 B2 | * | 8/2011 | Higgins-Luthman ..... | B60R 1/00 701/28 |

* cited by examiner

*Primary Examiner* — Jeffery Hofsass
(74) *Attorney, Agent, or Firm* — Lazaris IP

(57) ABSTRACT

A vehicular observation and detection apparatus and system incorporates a detection framework using video analysis to differentiate between motorized vehicles and bicycles for improved traffic flow and safety at intersections. The detection framework creates virtual zones overlaid on lanes of a roadway and analyzes input data representing objects in the virtual zones collected from one or more cameras positioned at or near the roadway.

31 Claims, 7 Drawing Sheets

BICYCLE DIFFERENTIATION USING VIDEO DATA ANALYTICS

CROSS-REFERENCE TO RELATED PATENT APPLICATIONS

This patent application is a continuation of, and claims priority to, Patent Cooperation Treaty application no. PCT/US2014/022874, with an international filing date of 10 Mar. 2014, and a Convention priority date of 13 Mar. 2013, pursuant to 35 U.S.C. §363, §365(c) and §120, and pursuant to 37 C.F.R. §1.53(b). The contents of the above-referenced Patent Cooperation Treaty application are incorporated in their entirety herein. In accordance with 37 C.F.R. §1.76, a claim of priority as a continuation application to the above-referenced Patent Cooperation Treaty application is included in an Application Data Sheet filed concurrently herewith.

FIELD OF THE INVENTION

The present invention relates generally to traffic observation and detection. More specifically, particular embodiments of the invention relate to traffic control systems, and to methods of observing and detecting the presence and movement of bicycles in traffic environments using data derived from cameras collecting video data and other sensors.

BACKGROUND OF THE INVENTION

There are many conventional traffic detection systems. Conventional detectors typically utilize sensors, either in the roadway itself, or positioned at a roadside location or on traffic lights. The most common type of vehicular sensors are inductive coils, or loops, embedded in a road surface. Other existing systems utilize video cameras, radar sensors, acoustic sensors, or magnetometers, either in the road itself, or at either the side of a roadway or positioned higher above traffic to observe and detect vehicles in a desired area.

While much attention has been paid to detecting motorized vehicles such as cars, trucks and motorcycles as they move through intersections, lesser attention has been given to the safe movement of bicycles. Bicycles are an important component of the traffic environment in many places, and create unique challenges to integrate them safely into the movement of vehicles throughout roadways, especially in urban areas.

Traditionally, bicycles have been detected via a variety of methods, such as special loops, video cameras, thermal cameras, micro radar in ground systems, and even manual push buttons. Yet each of these can be inaccurate means of robust and reliable detection, which may lead to comprised safety for bicyclists as they navigate traffic thoroughfares. The need for accurate bicycle detection generally involves ensuring that bicyclists have priority due to the greater possibility of injury from, and accidents with, higher-speed and larger motorized vehicles. For example, when a bicycle arrives at an intersection, the rider wishes to have the signal actuated so that the rider can safely cross the intersection under the green light in situations where the bicycle is accorded priority. Similarly, when crossing the intersection, the rider needs adequate time to safely cross under the green signal phase. For most intersections, there is a minimum green time that is set so that if only one motorized vehicle is detected, the light will stay green for only a short amount of time. Often this time is not adequate for a bicycle to cross the intersection safely under the green phase, due to the fact that bicycles are slower than motorized vehicles and therefore may need extra time for the minimum green phase. One problem facing traffic planners and engineers is that they typically do not set the minimum green time to account for bicyclists, because it would be used every signal cycle, whether a bicycle is present or not. So there is a need in conventional systems for uniquely differentiating bicycles from motorized vehicles so that these minimum times can be applied appropriately.

Traffic planners and engineers also require data on the volume of traffic at key points in a traffic network. This data is important for comparing volumes over periods of time to help with accurate adjustment of signal timing. Current methods of traffic detection result in a data collection that results only from a count of a total number of vehicles, which may or may not include bicycles. As the need for modified signal timing to accommodate bicyclists, as described above, becomes more critical for proper traffic management, a method for separating the count of bicycles from the count of other vehicles on a thoroughfare would greatly improve the ability to accurately manage traffic environments.

BRIEF SUMMARY OF THE INVENTION

The present invention discloses a bicycle detection system and method, and an associated method of performing traffic management in an intended area such as a traffic intersection. The bicycle detection system includes at least one camera, a housing, and circuitry capable of performing processing from data generated by the at least one camera. Methods of performing traffic management according to the present invention utilize this data to analyze traffic in a variety different situations and conditions.

The present invention achieves numerous objectives representing advancements over the existing art of conventional traffic detection systems. For example, the present invention provides an inclusive framework which does not require two separate systems to detect bicycles and vehicles. The present invention also provided greater flexibility for bicyclists to enjoy a higher degree of freedom in terms of movement, as compared with conventional detection systems that require the bicycles to be detected at a particular spot.

The present invention also provides enhanced signal and traffic safety. By properly detecting bicycles, traffic signal environments can safely provide passage for bicycle riders, while at the same time maintaining efficient operations when no bicycles are present.

Other objectives, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the accompanying figures which form a part thereof, and in which is shown, by way of illustration, exemplary embodiments illustrating the principles of the present invention and how it is practiced. Other embodiments will be utilized to practice the present invention and structural and functional changes will be made thereto without departing from the scope of the present invention.

Figure 1:
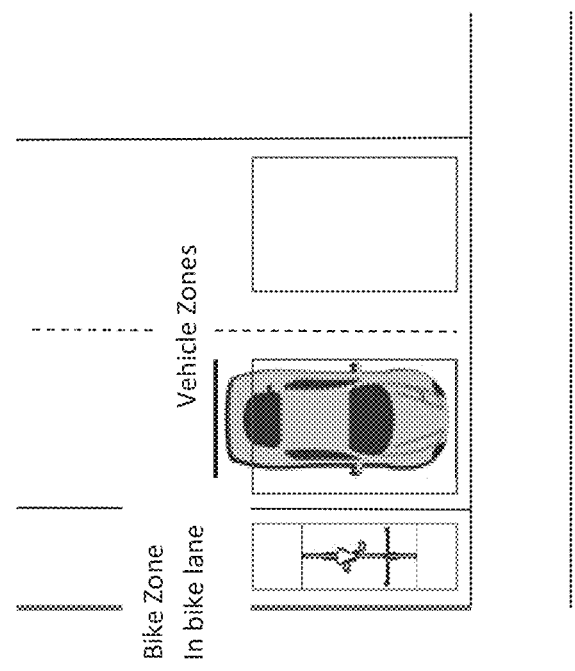
FIG. 1 is an example of an existing system in which virtual detection zones are identified.
Figure 2:
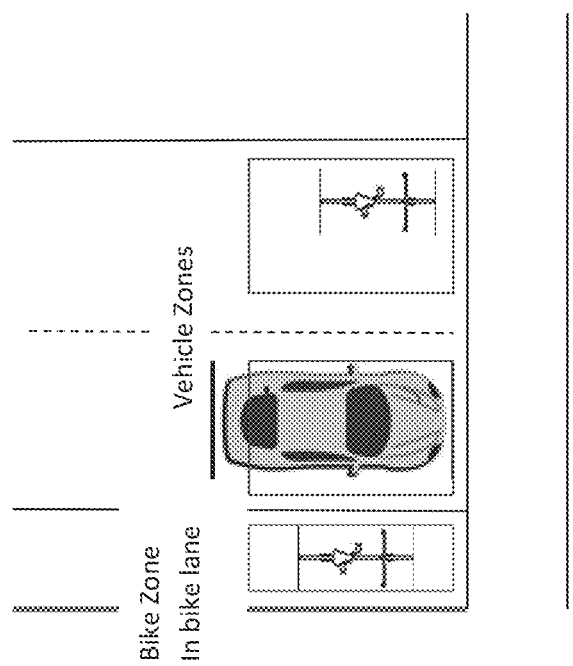
FIG. 2 is a further example of an existing system in which virtual detection zones are identified.

Historically, virtual detection zones used to identify the presence of vehicles in traffic detection systems are capable of detecting both motorized vehicles and bicycles, but are unable to accurately differentiate between them. FIG. 1 and FIG. 2 are an example of an existing system in which virtual detection zones are identified. FIG. 1 shows a typical thoroughfare arrangement where there are multiple vehicle zones, usually corresponding to marked lanes on a roadway. Roadways often have larger marked lanes for motorized vehicles and a smaller, bicycle-specific lane that is marked as such.

Virtual traffic detection zones typically employ multiple sensors, such as in-ground "loop" sensors, radar sensors, and video cameras, to try and detect the presence of vehicles. However, neither of these is able to adequately determine the difference between a motorized vehicle, such as a car, and a bicycle. In-ground sensors, such as inductive loops, are unable to detect bicycles that travel into vehicular lanes. Video cameras are able to detect a bicycle's presence, but it will be detected as a vehicle, with no knowledge of what type of vehicle it is. Radar sensors are able to detect a vehicle's presence approaching or at an intersection, but also are unable to accurately determine what type of vehicle it is. FIG. 2 shows illustrates this fundamental problem—bicycles often travel into vehicular lanes, and are often mis-detected as vehicles.

The present invention provides a detection system and method that is capable of differentiating between bicycles and motorized vehicles such as cars to uniquely provide accurate information to the traffic signal controller for more efficient and safe operation of a traffic environment. The detection system and method is intended to be integrated into a vehicular observation and detection apparatus incorporating sensors that include one or more of video cameras, radar, and in-pavement inductive loops. The vehicular observation and detection apparatus is to be mounted on or near a traffic signal, at a position above a roadway's surface, to enable optimum angles and views for detecting vehicles in the one or more intended areas with both the radar sensor and the camera.

Figure 3:
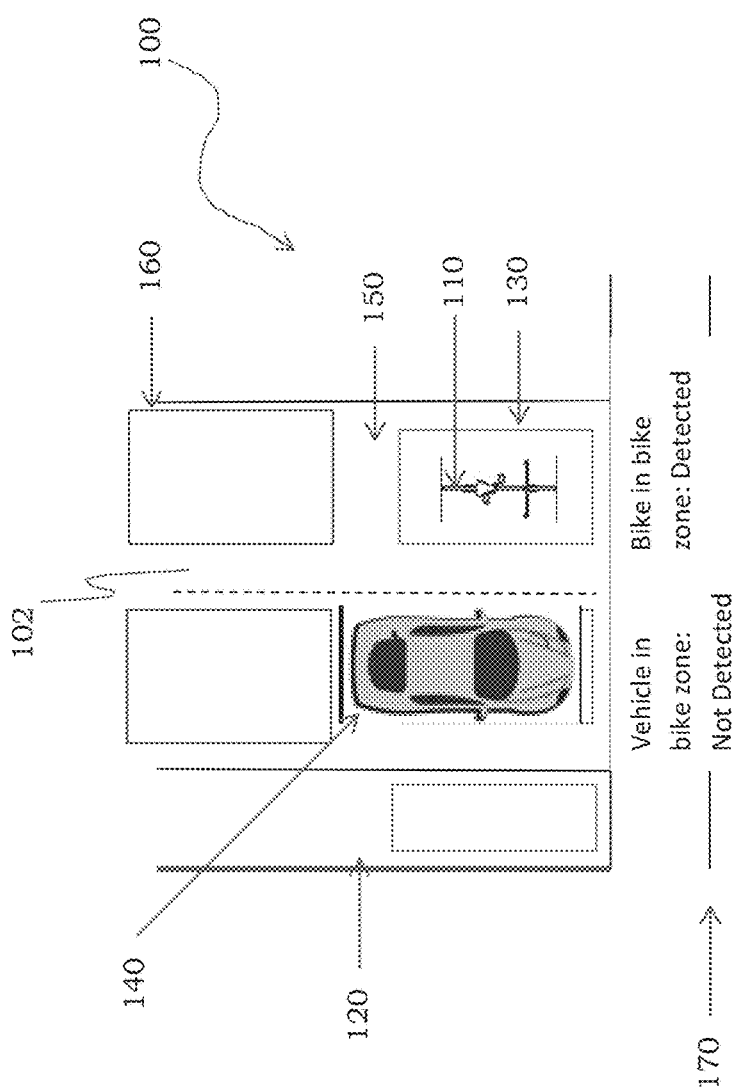
FIG. 3 is a diagram of a motorized vehicle and a bicycle in a roadway with detection zones in a differentiated detection framework according to the present invention.
Figure 4:
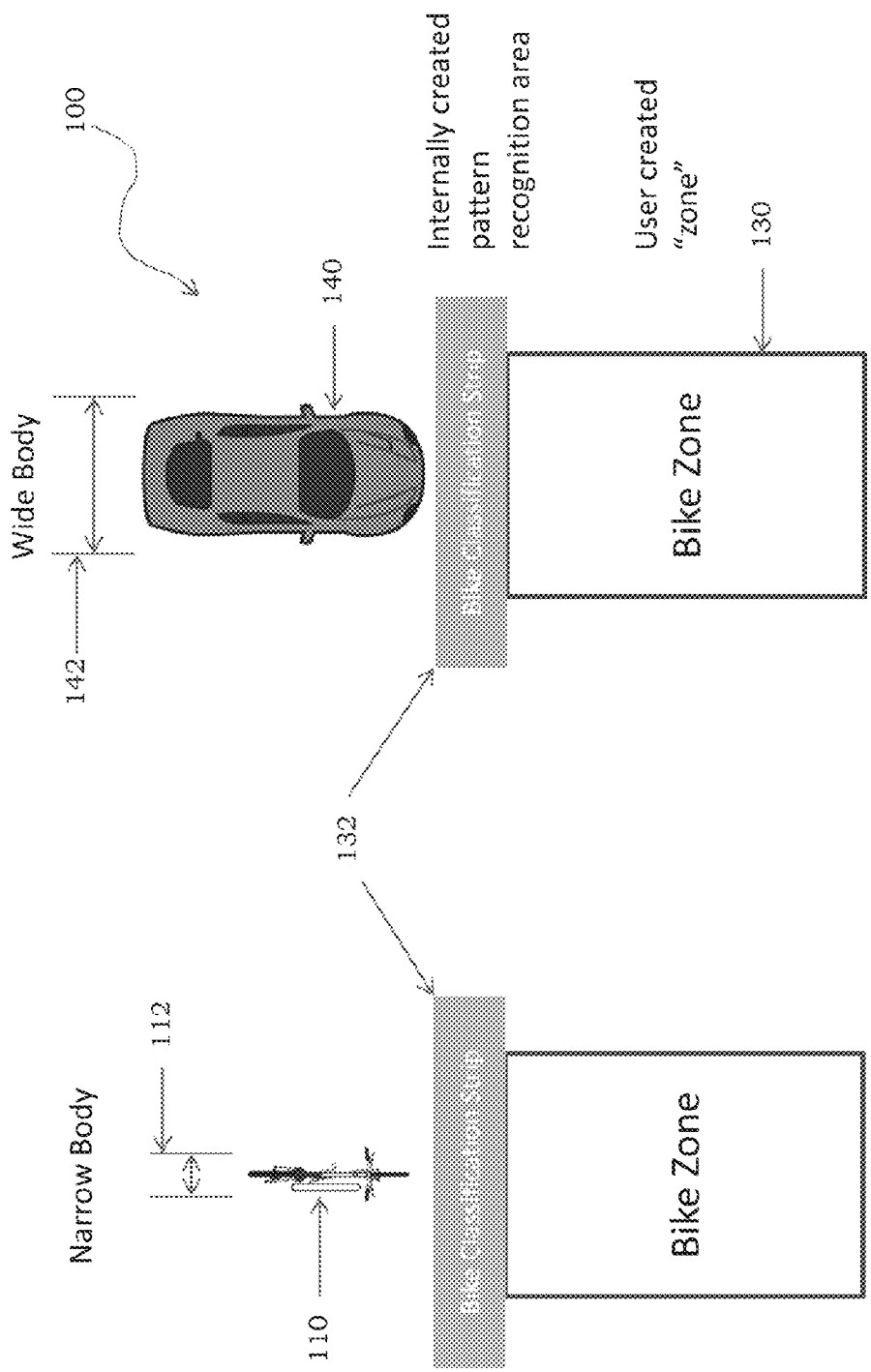
FIG. 4 is a further diagram of a differentiated detection framework according to the present invention.

FIGS. 3-7 demonstrate a framework and embodiments thereof for detecting differences between motorized vehicles and bicycles and confirming the accuracy of the initial observation. FIG. 3 and FIG. 4 are diagrams of traffic environments 102 illustrating a bicycle detection framework 100 according to the present invention, showing a bicycle 110 in a bicycle-specific lane 120, and a motorized vehicle 140 in a regular lane 150. The present invention creates unique bicycle zones 130 and virtually applies them to lanes in traffic thoroughfares 102 (which may also herein be referred to as roadways 102 or traffic environments 102) so that detections only occur when a bicycle 110 goes through the bicycle zone 130. Using the detection framework 100 described herein, if a vehicle 140 goes through the unique bicycle zone 130, detection is not activated. These bicycle-specific detection zones 130 can be applied anywhere in the traffic environment 102, including in vehicular traffic lanes 150, to detect only bicycles 110. This means that bicycles 110 traveling in normal vehicular traffic lanes 150 will be correctly identified as bicycles 110 so that appropriate signaling of the traffic controller can be triggered. Similarly, this means that motorized vehicles 140 that have entered the bicycle lane 120 will also be correctly identified as motorized vehicles 140, and not bicycles 110. This provides a truly flexible system for the traffic engineer to put in place, and provides the ability to count bicycles 110 separate from other vehicles 140.

In the detection framework 100 of the present invention, for each area of a roadway 102 in which a traffic engineer or other user would like to detect the presence of bicycles 110, a virtual bicycle zone 130 is created and positioned in vehicular lanes 150 and/or bicycle-specific lanes 120 as desired. Additionally, a bicycle detection strip 132 is automatically generated on top of and at a specified point adjacent to each virtual bicycle zone 130.

The bicycle detection strip 132 is an extension of the virtual bicycle zone 130 and is generated based on a number of considerations. It is an area adjacent to the virtual bicycle zone 130 that is automatically generated and represents an initial "triggering" area of the virtual bicycle zone 130 that is invisible to the traffic engineers and other users. The bicycle detection strip 132 has the same orientation as the bicycle zone 130, but has its own height and width.

The size of the bicycle detection strip 132 varies depending on the location of the virtual bicycle zone 130, its size, and the number and location of surrounding zones. When motion inside the bicycle detection strip 132 is detected, the present invention proceeds with determining what type of object is present within the virtual bicycle zone 130 as the object moves through the detection strip 132. The bicycle detection strip 132 therefore operates as a triggering area as noted above, so that when motion is observed using at least one of means of detection (for example, one or more video camera) available, additional data processing functions are initiated and applied to the rest of the virtual bicycle zone 130 to make an accurate determination of the type of object present.

In one aspect, the present invention uses object pattern recognition in an attempt to determine if the object present in the bicycle detection strip 132 is a narrow object 112 or a wide object 142. If it is a narrow object 112, and detection is indicated in the virtual bicycle zone 130, then a bicycle 110 will be determined. If it is a wide object 142 and detection is indicated in the virtual bicycle zone 130, a regular motorized vehicle 140 will be determined, and the detection will be rejected as "not a bicycle."

The detection framework 100 of the present invention therefore attempts to classify all moving objects into two classes: narrow moving objects 112 (assumed to be bicycles 110) and wide moving objects 142 (assumed to be motorized vehicles 140). In the bicycle detection strip 132, the present invention analyzes pixels that experience changes from frame to frame in a video data stream taken by one or more video cameras. Pixels within this stream are analyzed as the object passes through the bicycle detection strip 132 on a frame-by-frame basis. From this pixel-based analysis, the present invention derives an initial decision of whether the object moving through the bicycle detection strip 132 is wide 142 or narrow 112.

Therefore, object pattern classification is used in the area defined by the bicycle detection strip 132. The detection framework 100 does not rely solely on this decision, however. While the bicycle detection strip 132 provides a good initial decision of whether the object which is coming to the virtual bicycle zone 130 is wide 142 or narrow 112, the present invention performs further data processing to confirm or reject the decision from the pixel-based analysis. The detection framework 100 further analyzes characteristics of objects inside the virtual bicycle zone 130 to confirm or reject the initial decision as more information becomes available as the object passes through the virtual bicycle zone 130. For example, one characteristic is expected gray scale changes in images from the virtual bicycle zone 130. Once an object arrives in the bicycle zone 130 as indicated by its motion in the bicycle detection strip 132, the present invention looks for gray scale changes in images taken over time as the object passes through the bicycle zone 130. Another characteristic is predicted motion. The detection framework 100 attempts to compare behavior of an object with expected behavior of both a bicycle 110 and a motorized vehicle 140. Furthermore, a series of detection rules may also be applied to confirm or reject the initial decision from the bicycle detection strip 132. Examples of detection rules involve a speed of the object, visibility of a person riding on the bicycle 110 or in a motorized vehicle 140, visibility of vehicle registration tags, whether and how quickly an object begins to charge an inductive loop embedded in the roadway 102, and other characteristics differentiating bicycles 110 from motorized vehicles 140. One or more outcomes of these characteristic analyses are then applied to confirm or reject an earlier decision based on the bicycle detection strip 132 for the presence of a bicycle 110 in the virtual bicycle zone 130.

It should be noted that means of detection as contemplated by the present invention may include other detection devices. For example radar sensors may be incorporated into the detection framework 100, as well as inductive loops embedded in a roadway 102. In the present invention, multiple means of detection may be utilized to collected input data for performing the one or more data processing functions disclosed herein. It is therefore contemplated that data from multiple detection sensors may be incorporated and are within the scope of the present invention.

Figure 5:
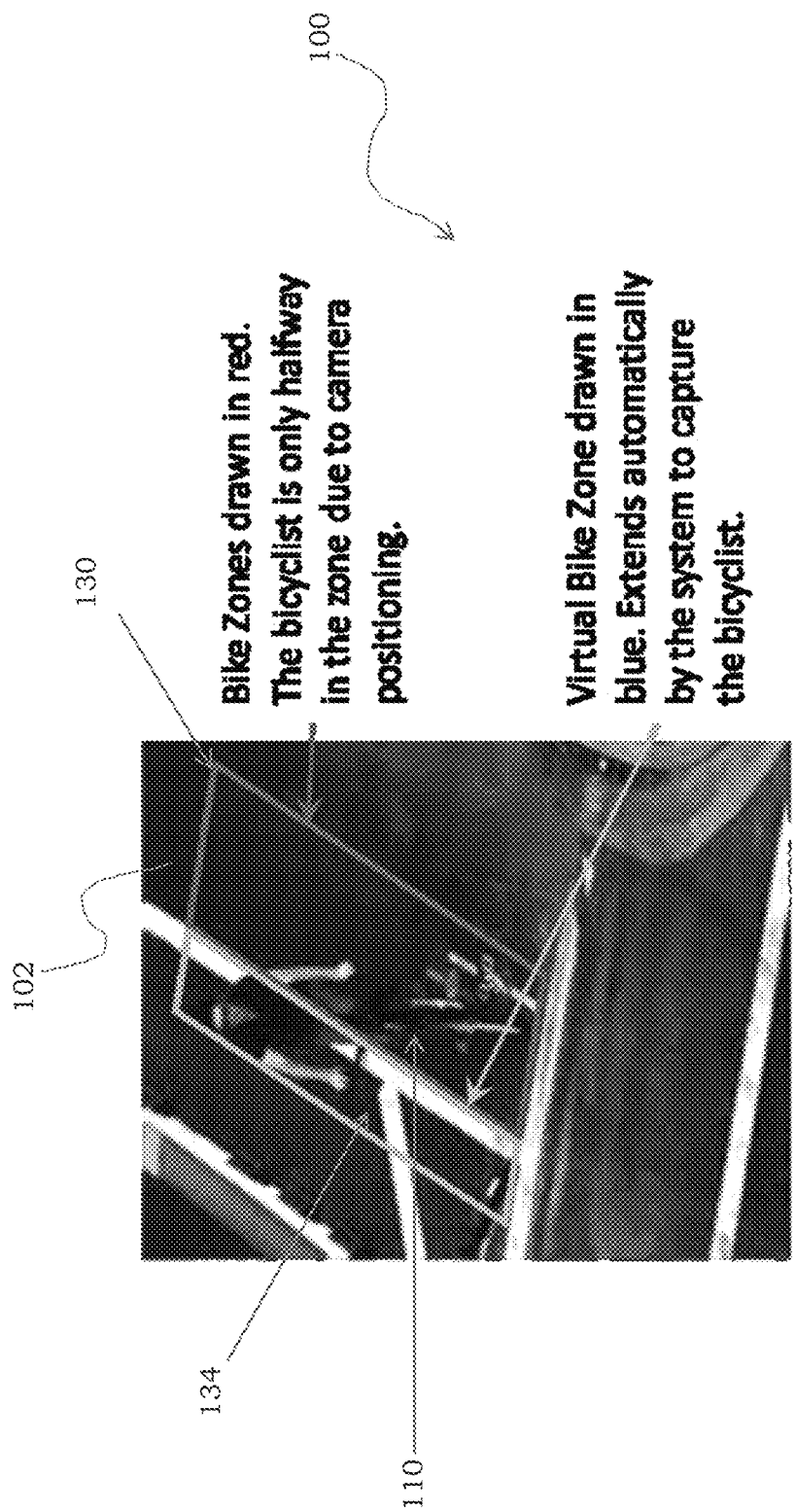
FIG. 5 is a diagram of an expanded bicycle zone to account for camera angle according to the present invention.

FIG. 5 shows an aspect of the present invention in which an expanded virtual zone 134 is created to extend a virtual bicycle zone 130 to account for the angle of a video camera above or next to a roadway 102, intended to capture a bicyclist and correctly detect the presence of the bicycle 110. This situation is desirable where a camera is not mounted directly above the bicycle lane 120, and the virtually-created bicycle zone 130 with a rectangular orientation may not suffice to detect a bicycle rider's body. Because of the angled position of the camera relative to the bicycle lane 120, the body of the bicycle rider may appear out of the regularly-oriented zone, and analysis of images in the bicycle zone 130 may mis-detect the object and fail to properly adjust signaling to account for the presence of a bicyclist. Therefore, the virtual bicycle zone 130 is expanded to form a parallelogram shape. This attribute therefore extends the zone in an attempt to capture the rider.

Figure 6:
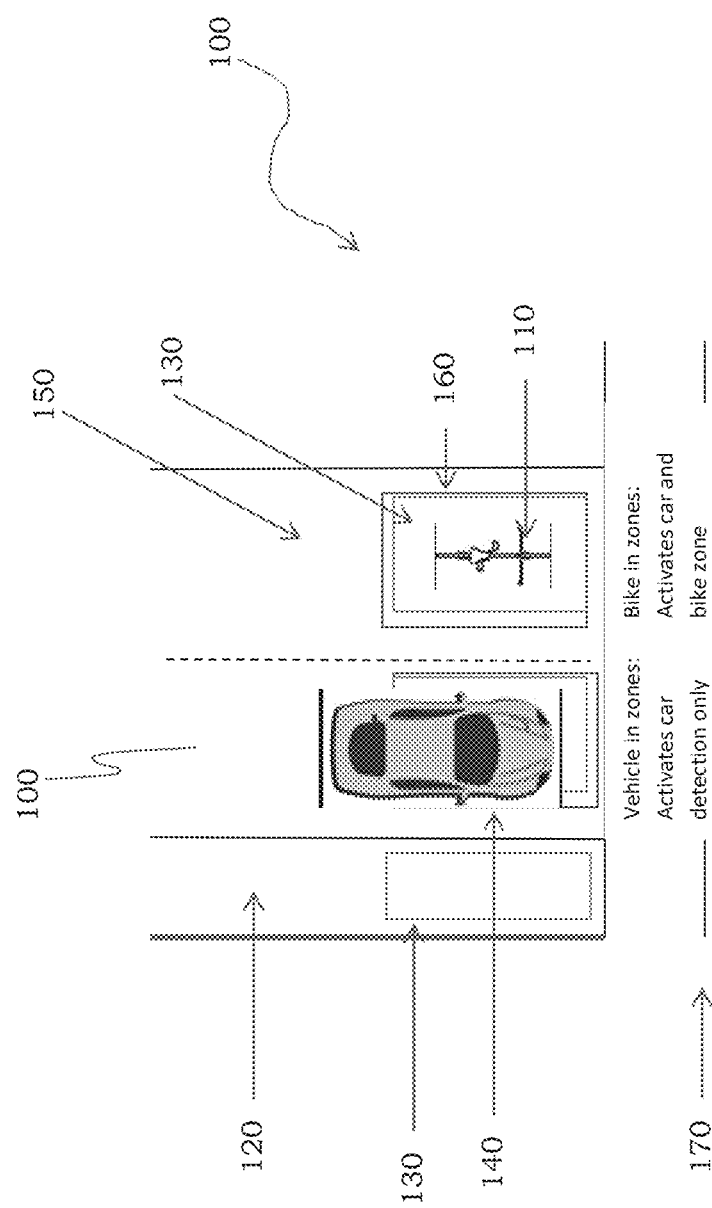
FIG. 6 is a diagram of a motorized vehicle and a bicycle in a roadway with detection zones in a differentiated detection framework according to one embodiment of the present invention.

FIG. 6 shows one embodiment of the present invention in which virtual zones for detection may be overlaid on each other, so that when a motorized vehicle 140 such as a car is detected as being at a "stop" bar 170, it is correctly detected as a motorized vehicle 140 and a vehicular detection zone 160 is activated, but the expanded virtual bicycle zone 134 is not activated. When a bicycle 110 is present and at the stop bar 170, it is initially detected as a bicycle 110, but both the vehicular detection zone 160 and the bicycle zone 130 are activated and overlap on each other.

In this aspect of the present invention, logic is then applied to determine the proper detection. If the video (or, where applicable, radar, and/or loop sensors) indicate the presence of a vehicle 140 in overlapping virtual detection zones 130 and 160, car detection is activated to confirm the presence of a motorized vehicle 140. If the video, radar, and or/or loop sensors indicate the presence of a bicycle 110 in overlapping virtual detection zones 130 and 160, the extended virtual bicycle zone 134 is activated to confirm the presence of a bicycle 110.

Figure 7:
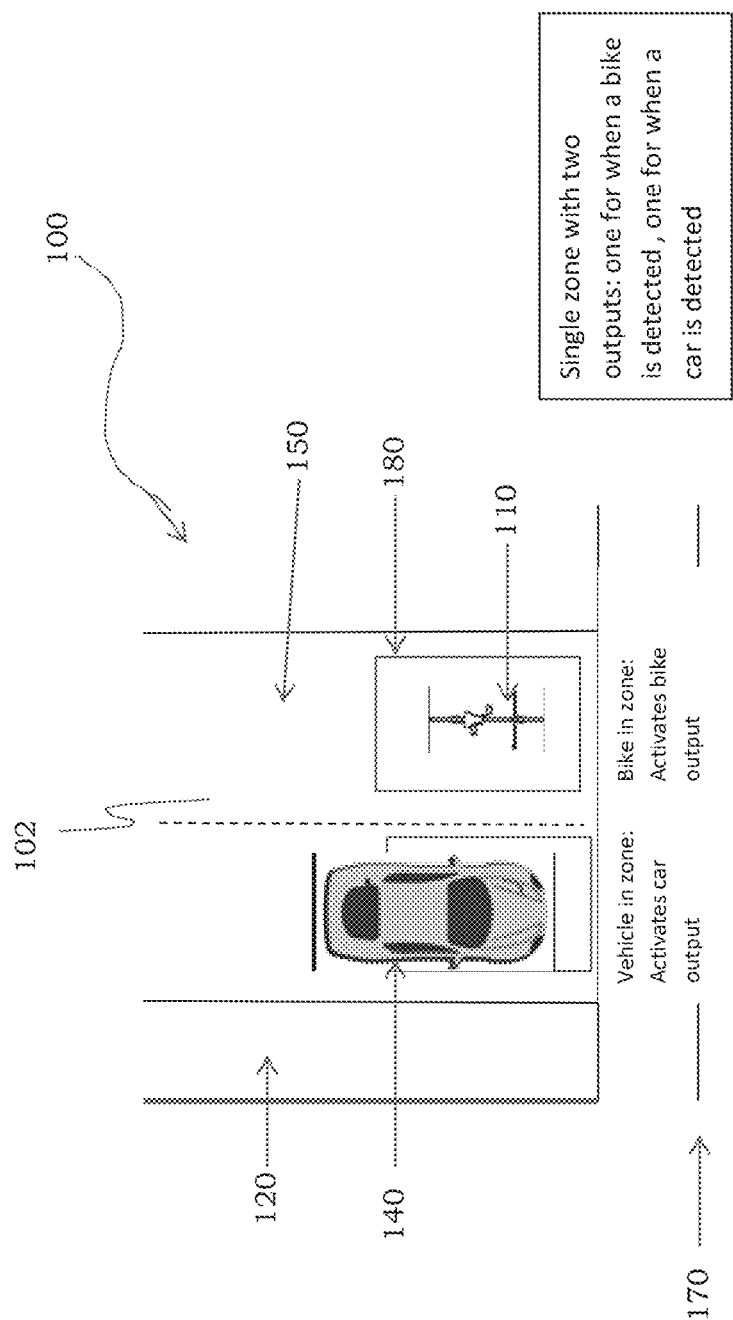
FIG. 7 is a diagram of a motorized vehicle and a bicycle in a roadway with detection zones in a differentiated detection framework according to another embodiment of the present invention.

FIG. 7 illustrates a detection framework 100 according to another embodiment of the present invention, in which a commonly-oriented detection zone 180 is established within which both bicycles 110 and motorized vehicles 140 are uniquely detected. This detection zone 180 provides two separate outputs—one for a motorized vehicle 140 detection and a second for a bicycle 110 detection. In this embodiment, one virtual zone 180 is drawn for each lane in a roadway 102, and detection analyses discussed herein are performed within each zone 180 for a determination of the type of object present. In this embodiment, instead of making an initial determination of whether the object is a motorized vehicle 140 or a bicycle 110 based on the application of specific virtual bicycle zones 130 (whether it includes a bicycle detection strip 132 or is overlaid on a vehicle zone 160), each detection zone 180 is virtually created in the same manner, and is capable of generating two outputs: one where the object present is a motorized vehicle 140, and one where the object present is a bicycle 110. In other words, instead of attempting to initially predict the type of vehicle from application of a zone specific to a type of vehicle, in this embodiment, the present invention creates the same virtual zone 180 for each, and performs the ancillary processing discussed herein to make a determination about what type of object is present. If this processing determines a motorized vehicle 140, one set of output signals is generated. Similarly, if this processing determines a bicycle 110 is present, another set of output signals is generated.

Regardless of the embodiment, the present invention is intended to provide output data that performs traffic signal control by adjusting traffic lights to accommodate the presence of bicyclists. The detection framework 100 disclosed herein is communicatively connected with a traffic signal controller proximate to a traffic intersection for which thoroughfares 102 are analyzed, and generates signals as output data to instruct the traffic controller based on the data analytics performed. As noted above, for most intersections, there is a minimum green time that is set so that if only one vehicle is detected, and if so, the traffic light will stay green for only a short amount of time. Often this time is not adequate for a bicycle 110 to cross the intersection safely under the green phase, due to the fact that bicycles 110 are slower than motorized vehicles 140 and therefore may need extra time for the minimum green phase. The present invention therefore improves bicycle safety and provides a mechanism for conferring signal priority for bicyclists.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. For example, the present invention may overlay a third type of detection zone that is intended to account for the presence of mass transit vehicles. Similarly, in addition to making an initial determination of whether an object is wide or narrow, the present invention may include a third or fourth size criteria for objects, such as for example "long" or "high" to predict the presence of mass transit vehicles. It is therefore intended that the scope of the invention be limited not by this detailed description.

The invention claimed is:

1. A method of detecting a presence of bicycles in a roadway for traffic signal controller management, comprising:
   creating a virtual bicycle zone in a field of view that includes in one or more lanes of a roadway near a traffic intersection;
   generating a bicycle detection strip in or adjacent to the virtual bicycle zone;
   detecting motion inside the bicycle detection strip using an object detection means; and
   initiating one or more data processing functions embodied in a plurality of instructions configured to classify a type of object present as the object travels through the bicycle detection strip, the one or more data processing functions including determining whether the object present in the bicycle detection strip is classified as either a bicycle or as a motorized vehicle by analyzing a plurality of pixels that experience changes from frame to frame in a video data stream as the object passes through.

2. The method of claim 1, further comprising expanding the virtual bicycle zone to account for a camera angle relative to the field of view.

3. The method of claim 1, wherein the bicycle detection strip has an independent size and shape relative to the virtual bicycle zone.

4. The method of claim 1, wherein the bicycle detection strip is automatically generated every time a virtual bicycle zone is created.

5. The method of claim 1, wherein a size and location of the bicycle detection strip varies depending on a location of the virtual bicycle zone in the field of view.

6. The method of claim 1, wherein the object detection means is at least one video camera positioned above or near the roadway.

7. The method of claim 1, wherein the additional data from the object detection means differentiating bicycles from motorized vehicles is a speed of the object.

8. The method of claim 1, further comprising creating a virtual vehicle zone for detecting a presence of motorized vehicles in the one or more lanes of the roadway.

9. A vehicular detection apparatus comprising:
   a virtual bicycle zone overlaid on a field of view that includes on one or more lanes of a roadway near a traffic intersection;
   a bicycle detection strip applied to the virtual bicycle zone;
   one or more detection devices arranged relative to the one or more lanes of the roadway surface to sense a presence of an object in the bicycle detection strip and generate one or more signals for determination of whether the object is a bicycle or a motorized vehicle;
   a plurality of modules configured to apply data processing functions to the one or more signals generated by the plurality of detection devices, the one or more data processing functions embodied in a plurality of instructions configured to classify a type of the object present as the object travels through the bicycle detection strip, the data processing functions configured to determine whether the object present in the bicycle detection strip is classified as either a bicycle or as a motorized vehicle by analyzing a plurality of pixels that experience changes from frame to frame in a video data stream as the object passes through.

10. The apparatus of claim 9, wherein the plurality of detection devices include at least one video camera positioned at an angle relative to the field of view.

11. The apparatus of claim 9, wherein the virtual bicycle zone and the bicycle detection strip are generated by a detection processor located proximate to an intersection traffic controller responsible for traffic signal management at the intersection.

12. The apparatus of claim 9, further comprising an expansion of the virtual bicycle zone to account for a camera angle relative to the field of view.

13. The apparatus of claim 9, wherein the bicycle detection strip has a unique height and a unique width relative to the virtual bicycle zone.

14. The apparatus of claim 9, wherein the bicycle detection strip is automatically generated every time a virtual bicycle zone is created.

15. The apparatus of claim 9, further comprising a virtual vehicle zone for detecting a presence of motorized vehicles, overlaid on the field of view.

16. The apparatus of claim 15, wherein the virtual bicycle zone and the virtual vehicle zone overlap in the field of view.

17. A method of performing traffic management in an intended area, comprising:
   collecting input data triggered by movement of an object into a bicycle detection strip within or adjacent to a virtually-created bicycle zone in a field of view that includes one or more lanes of a roadway proximate to a traffic intersection, the input data collected from a plurality of detection devices located in or near each lane of the roadway;
   performing one or more data processing functions embodied in a plurality of instructions configured to classify a type of object from the input data as the object travels through the bicycle detection strip, the one or more data processing functions including determining whether the object present in the bicycle detection strip is classified as either a bicycle or as a motorized vehicle by analyzing a plurality of pixels that experience changes from frame to frame in a video data stream as the object passes through; and generating output data in one more signals to a traffic signal controller to adjust a timing of at least one traffic light in the traffic intersection where a bicycle is detected.

18. The method of claim 17, further comprising generating the bicycle detection strip in or adjacent to the virtually-created bicycle zone.

19. The method of claim 18, further comprising automatically generating the bicycle detections strip each time the virtually-created bicycle zone is created, wherein the bicycle detection strip has an independent size and shape relative to the virtually-created bicycle zone.

20. The method of claim 17, further comprising expanding the virtually-created bicycle zone to account for a camera angle relative to the field of view.

21. The method of claim 17, further comprising detecting the object in the bicycle detection strip using the plurality of detection devices, the plurality of detection devices including at least one video camera.

22. The method of claim 17, further comprising generating a virtually-created vehicle zone for detecting a presence of motorized vehicles.

23. The method of claim 22, wherein the virtually-created bicycle zone and the virtually-created vehicle zone overlap in the field of view.

24. A method of detecting a presence of bicycles in a roadway for traffic signal controller management, comprising:

creating a virtual bicycle zone in a field of view that includes in one or more lanes of a roadway near a traffic intersection;

generating a bicycle detection strip in the virtual bicycle zone;

detecting motion inside the bicycle detection strip using an object detection means; and initiating one or more data processing functions embodied in a plurality of instructions configured to classify a type of object present as the object travels through the bicycle detection strip, the one or more data processing functions including determining whether the object present in the bicycle detection strip is classified as either a bicycle or as a motorized vehicle by analyzing a plurality of pixels in a video data stream as the object passes through by a comparison with other identified characteristics or features.

25. The method of claim 24, further comprising expanding the virtual bicycle zone to account for a camera angle relative to the field of view.

26. The method of claim 24, wherein the bicycle detection strip has an independent size and shape relative to the virtual bicycle zone.

27. The method of claim 24, wherein the bicycle detection strip is automatically generated every time a virtual bicycle zone is created.

28. The method of claim 24, wherein a size and location of the bicycle detection strip varies depending on a location of the virtual bicycle zone in the field of view.

29. The method of claim 24, wherein the object detection means is at least one video camera positioned above or near the roadway.

30. The method of claim 24, wherein the additional data from the object detection means differentiating bicycles from motorized vehicles is a speed of the object.

31. The method of claim 24, further comprising creating a virtual vehicle zone for detecting a presence of motorized vehicles in the one or more lanes of the roadway.

* * * * *